United States Patent
Sampath

(10) Patent No.: US 8,948,032 B1
(45) Date of Patent: Feb. 3, 2015

(54) PSEUDOWIRE PACKET LOSS MEASUREMENT

(75) Inventor: Prabakaran Thirumali Sampath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 158 days.

(21) Appl. No.: 13/042,059

(22) Filed: Mar. 7, 2011

(51) Int. Cl.
*H04L 12/26* (2006.01)

(52) U.S. Cl.
USPC .......................................... 370/252

(58) Field of Classification Search
USPC .................... 370/252, 241, 351, 355, 356
See application file for complete search history.

(56) References Cited

U.S. PATENT DOCUMENTS

| | | | |
|---|---|---|---|
| 6,502,001 B1 * | 12/2002 | Kurono et al. | 700/86 |
| 7,606,203 B1 * | 10/2009 | Shabtay et al. | 370/332 |
| 7,623,449 B2 | 11/2009 | Shabtay | |
| 2006/0002370 A1 | 1/2006 | Rabie et al. | |
| 2006/0285500 A1 * | 12/2006 | Booth et al. | 370/250 |
| 2007/0038798 A1 | 2/2007 | Bouchard et al. | |
| 2007/0263535 A1 | 11/2007 | Shabtay | |
| 2008/0080390 A1 * | 4/2008 | Ebuchi et al. | 370/253 |
| 2012/0076013 A1 * | 3/2012 | Cheng | 370/252 |
| 2013/0230050 A1 * | 9/2013 | Mohan et al. | 370/392 |

OTHER PUBLICATIONS

First Office Action and Search Report, and translation thereof, from counterpart Chinese Application No. 201210072022X, mailed Jun. 23, 2014, 22 pp.

Jeong-Dong Ryoo et al., "OAM and its performance monitoring mechanisms for carrier ethernet transport networks," IEEE Communications Magazine, IEEE Service Center Piscatawy, US, vol. 46 No. 3, Mar. 1, 2008, 7 pp.

Office Action from U.S. Appl. No. 13/049,676, dated Jul. 1, 2013, 41 pp.

Response to Final Office Action dated Jul. 1, 2013, from U.S. Appl. No. 13/049,676, filed Oct. 1, 2013, 27 pp.

Rosen et al., "MPLS Label Stack Encoding," Network Working Group, RFC 3032, Jan. 2001, 23 pp.

ITU-T Y.1731: "OAM functions and mechanisms for Ethernet based networks," May 2006, 80 pp.

Zimmerman, "OSI Reference Model—The ISO Model of Architecture for Open Systems Interconnection," IEEE Transaction on Communications, vol. 28, No. 4, Apr. 1980, pp. 425-432.

Bryant et al., RFC 3985, "Pseudo Wire Emulation Edge-to-Edge (PWE3) Architecture," Mar. 2005, 40 pp.

Lasserre et al., RFC 4762, "Virtual Private LAN Service (VPLS) Using Label Distribution Protocol (LDP) Signaling," Jan. 2007, 32 pp.

(Continued)

*Primary Examiner* — Andrew Lai
*Assistant Examiner* — Zhiren Qin
(74) *Attorney, Agent, or Firm* — Shumaker & Sieffert, P.A.

(57) ABSTRACT

In general, techniques are described for measuring service-specific packet data unit (PDU) loss for individual pseudowires that interconnect two or more L2 customer networks in a L2 virtual private network (L2VPN), such as a VPLS instance. In one example of the techniques, for every pseudowire of a VPLS instance pseudowire mesh, a pseudowire label policer at each of the pseudowire endpoints maintains respective counters for the number of PDUs transmitted and received at the endpoint. The pseudowire label policer may identify service-specific PDUs transmitted and received over individual pseudowires of the VPLS instance by mapping pseudowire labels for the PDUs to the VPLS instance.

19 Claims, 6 Drawing Sheets

(56) References Cited

OTHER PUBLICATIONS

Harrington et al., "An Architecture for Describing Simple Network Management Protocol (SNMP) Management Frameworks," RFC 3411, Dec. 2002, 65 pp.

U.S. Appl. No. 12/266,298, by Kaushik Ghosh, filed Nov. 6, 2008.

U.S. Appl. No. 12/195,686, filed Aug. 21, 2008.

U.S. Appl. No. 13/049,676, by Prabakaran Thirumali Sampath, filed Mar. 16, 2011.

Response to Office Action dated Feb. 12, 2013, from U.S. Appl. No. 13/049,676, filed May 13, 2013, 27 pp.

Office Action from U.S. Appl. No. 13/049,676, dated Feb. 12, 2013, 44 pp.

* cited by examiner

PSEUDOWIRE PACKET LOSS MEASUREMENT

TECHNICAL FIELD

The invention relates to computer networks and, more specifically, to monitoring computer network performance.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

To monitor L2 performance metrics and verify operation, network administrators implement a process referred to as Operations, Administration and Maintenance (OAM), which generally provides the activities, tools, standards and other techniques that involve operating, administering and maintaining connectivity in the L2 computer network. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

SUMMARY

In general, techniques are described for measuring service-specific packet data unit (PDU) loss for pseudowires that interconnect two or more L2 customer networks in a L2 virtual private network (L2VPN). Network service providers offer systems that provide L2 connectivity between multiple, geographically separate L2 customer networks. That is, separate L2 customer networks (or "customer network sites") may be interconnected by the service provider to provide L2 connectivity as though the customer network sites were directly connected. One mechanism by which network service providers provide L2 connectivity to their customers is by use of a virtual private local area network service (VPLS). A customer-specific VPLS instance transports layer two (L2) communications, such as Ethernet packets, between customer network sites through the service provider network core. In a typical configuration, routers coupled to the customer network sites define label switched paths (LSPs) that may be used to carry pseudowires that carry encapsulated L2 communications within the provider network as if the customer network sites were directly attached to the same local area network (LAN). Each of the routers then operates as a virtual L2 switch or bridge having customer- and core-facing interfaces to connect the multiple segments of an overall customer network defined by the individual customer network sites.

The techniques may be useful for service provider networks that use pseudowires to emulate essential attributes of a provided service, where pseudowire operation involves attaching a pseudowire label to service-specific PDUs at an ingress service provider edge (PE) device for the pseudowire and the resulting PDUs to an egress PE device. In one example of the techniques, for every pseudowire of a VPLS instance pseudowire mesh, a pseudowire label policer at each of the pseudowire endpoints maintains respective counters for the number of service-specific PDUs transmitted and received at the endpoint. The pseudowire label policer may identify PDUs transmitted and received over individual pseudowires for the VPLS instance by mapping pseudowire labels for the PDUs to the VPLS instance, thereby providing a fine level of granularity for measuring packet loss on a per pseudowire basis.

The techniques may be applied, for example, by network service providers that offer L2 connectively in accordance with service-level agreements (SLA) with their customers, where the SLAs define both the services that are to be provided and a promised level of performance for the services. The performance level specifies measurable metrics such as bandwidth guarantees, up-time percentages, and the number of serviceable users. Another metric commonly defined in an SLA is frame loss performance, which is typically expressed as a ratio of the number of service frames (e.g., encapsulated L2 communications) not delivered to the total number of service frames during a particular time interval. To monitor these L2 performance metrics and verify operation of services that conform to an SLA, service providers implement OAM, which monitors PDU loss at service endpoints to determine end-to-end per-service-instance L2 OAM loss measurements.

Applying the described techniques may improve loss measurement accuracy for a VPLS instance by measuring pseudowire packet counts at the endpoints of pseudowires of the VPLS instance rather than at the service endpoints. As such, the techniques allow the number of pseudowire packets transmitted at one endpoint of a pseudowire to be compared to the number of pseudowire packets received at the other endpoint of the pseudowire, thereby allowing the service provider to accurately determine the number of lost packets for individual pseudowires basis and thereby calculate a packet loss ratio for a given pseudowire over a given period. Calculated packet loss ratios for each of the pseudowires of the VPLS instance mesh may be averaged or otherwise analyzed to provide an overall packet loss ratio for the VPLS instance. These more accurate loss measurements for the service may improve the ability of the service provider to verify to customers that operation of the service meets the performance requirements of an SLA, for instance.

In one embodiment, the invention is directed to a method comprising switching layer two (L2) packet data units (PDUs) with a local router between a local L2 network, coupled by an attachment circuit for a Virtual Private Local Area Network (LAN) Service (VPLS) instance to the local router, and one or more remote L2 networks to provide the VPLS instance to the local and remote L2 networks, wherein the local router terminates one or more pseudowires that operate over a layer three (L3) packet-switched network (PSN) to carry the PDUs in pseudowire packets to connect, for the VPLS instance, the local router to one or more corresponding remote routers that each serves a corresponding one of the remote L2 networks. The method also comprises incrementing, with the local router, a respective transmit counter for each of the one or more pseudowires for pseudowire packets the local router sends over the corresponding pseudowires, and incrementing, with the local router, a respective receipt counter for each of the one or more pseudowires for pseudowire packets the local router receives over the corresponding pseudowires. The method also comprises determining pseudowire packet loss data for each of the one or more pseudowires based at least on the respective transmit counter and receipt counter values for the each of the one or more pseudowire, and sending the loss measurement data from the local router to a management entity.

In another embodiment, the invention is directed to a router comprising a control unit having one or more processors. The router also comprises an interface card. The router further comprises a Virtual Private Local Area Network (LAN) Service (VPLS) layer of the control unit to switch layer two (L2) packet data units (PDUs) between a local L2 network, coupled by an attachment circuit for a VPLS instance to the interface card, and one or more remote L2 networks to provide the VPLS instance to the local and remote L2 networks, wherein the router terminates one or more pseudowires that operate over a layer three (L3) packet-switched network (PSN) to carry the PDUs in pseudowire packets to connect, for the VPLS instance, the router to one or more corresponding remote routers that each serves a corresponding one of the remote L2 networks. The router also comprises a pseudowire label policer of the control unit that increments a respective transmit counter for each of the one or more pseudowires for pseudowire packets the VPLS layer sends over the corresponding pseudowire, wherein the pseudowire label policer increments a respective receipt counter for each of the one or more pseudowires for pseudowire packets the VPLS layer receives over the corresponding pseudowire. The router also comprises a loss measurement module of the control unit that determines pseudowire packet loss data for each of the one or more pseudowires based at least on the respective transmit counter and receipt counter values for the each of the one or more pseudowires, and a management interface of the control unit that sends the loss measurement data to a management entity.

In another embodiment, the invention is directed to a non-transitory computer-readable medium containing instructions. The instructions cause a programmable processor to switch layer two (L2) packet data units (PDUs) with a local router between a local L2 network, coupled by an attachment circuit for an L2 switching service to the local router, and one or more remote L2 networks to provide the L2 switching service to the local and remote L2 networks, wherein the local router terminates one or more service links that operate over a layer three (L3) packet-switched network (PSN) to carry the PDUs in service packets to connect, for the L2 switching service, the local router to one or more corresponding remote routers that each serves a corresponding one of the remote L2 networks. The instructions additionally cause the processor to increment a respective transmit counter for each of the one or more service links for service packets the local router sends over the corresponding service link. The instructions also cause the processor to increment a respective receipt counter for each of the one or more service links for service packets the local router receives over the corresponding service link. The instructions further cause the processor to determine service packet loss data for each of the one or more service links based at least on the respective transmit counter and receipt counter values for the each of the one or more service links, and send the loss measurement data from the local router to a management entity.

In another embodiment, the invention is directed to a method comprising switching layer two (L2) packet data units (PDUs) with a local router between a local L2 network, coupled by an attachment circuit for an L2 switching service to the local router, and one or more remote L2 networks to provide the L2 switching service to the local and remote L2 networks, wherein the local router terminates one or more service links that operate over a layer three (L3) packet-switched network (PSN) to carry the PDUs in service packets to connect, for the L2 switching service, the local router to one or more corresponding remote routers that each serves a corresponding one of the remote L2 networks. The method also comprises incrementing, with the local router, a respective transmit counter for each of the one or more service links for service packets the local router sends over the corresponding service link. The method additionally comprises incrementing, with the local router, a respective receipt counter for each of the one or more service links for service packets the local router receives over the corresponding service link. The method further comprises determining service packet loss data for each of the one or more service links based at least on the respective transmit counter and receipt counter values for the each of the one or more service links, and sending the loss measurement data from the local router to a management entity.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
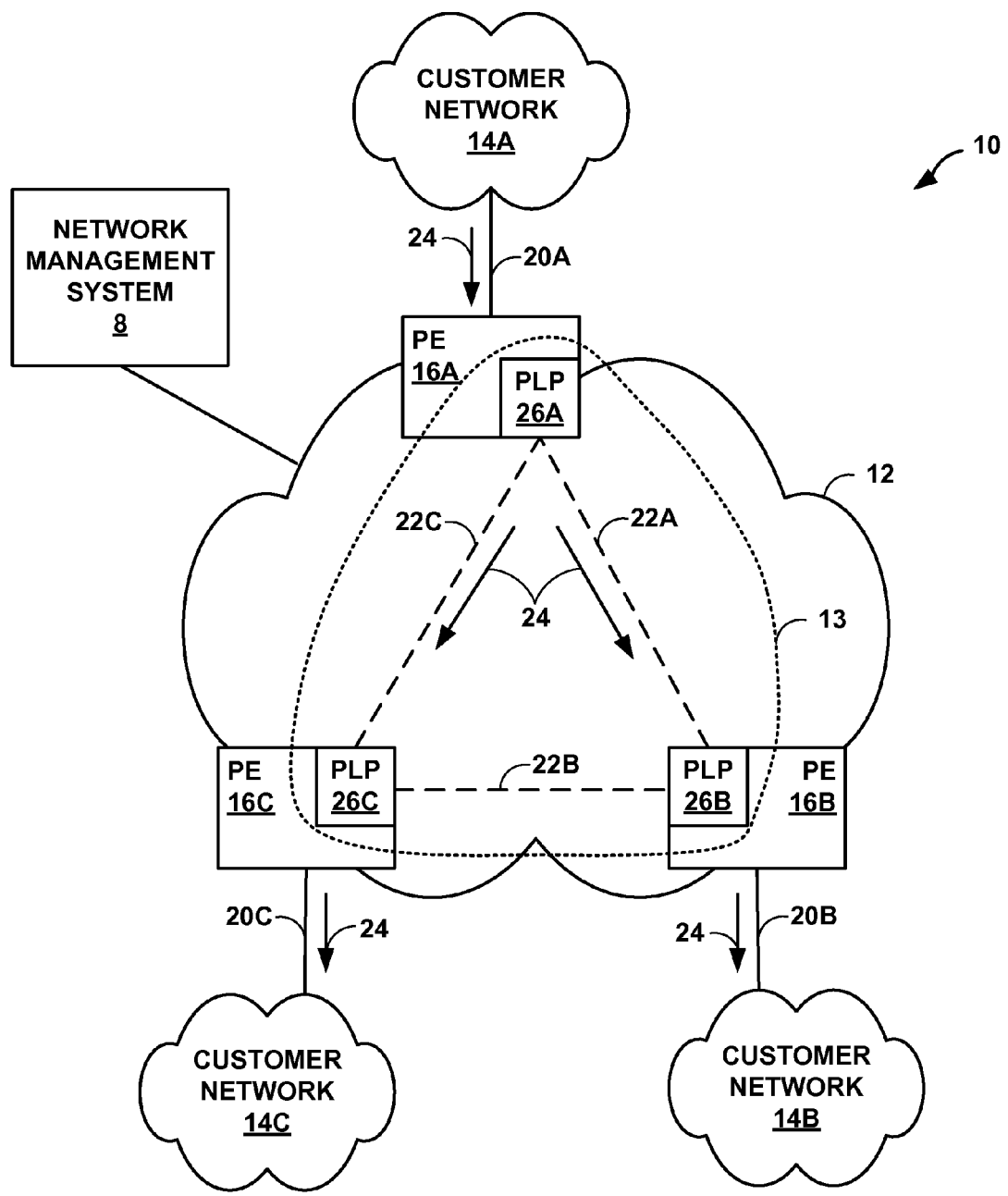
FIG. 1 is a block diagram illustrating a network system in which one or more network devices monitor emulated service traffic at pseudowire endpoints according to the techniques described herein.

FIG. 1 is a block diagram illustrating a network system 10 in which one or more network devices monitor emulated service traffic at service link endpoints according to the techniques described herein. As shown in FIG. 1, network system 10 includes a network 12 and customer networks 14A-14C ("customer networks 14"). Network 12 may represent a public network that is owned and operated by a service provider to interconnect a plurality of edge networks, such as customer networks 14. As a result, network 12 may be referred to herein as a Service Provider (SP) network or, alternatively, as a "core network" in that network 12 may act as a core to interconnect other SP networks or edge networks, such as customer networks 14. Example service providers include Verizon Communications Inc. or American Telephone & Telegraph (AT&T™) Company.

The service providers may lease portions of network 12 or provide bridging (or switching) services offering interconnection through network 12 to customer networks 14, which may lease the portions or purchase the services provided by network 12 to create a Layer 2 Virtual Private Network (L2VPN) interconnecting the various layer 2 (L2) customer networks 14. The bridging service may be, for example, an L2VPN, a Virtual Private Local Area Network (LAN) Service (VPLS), or a virtual leased line (VLL). Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

In the illustrated embodiment, network 12 provides a type of L2VPN, a VPLS instance 13 in this example, to transparently interconnect these layer 2 networks, e.g., customer networks 14, to one another via service provider network 12. Network 12 may provide VPLS instance 13 to a customer by transparently emulating a direct connection between these various customer networks 14 such that, from the perspective of customer networks 14, each of customer networks 14 appears to directly connect to one another. Moreover, different VPLS instances, including corresponding virtual routing and forwarding information (VRFs), may be maintained by routers within network 12. VPLS instance 13 is illustrated in FIG. 1 to pass through PEs 16 to illustrate the application of packet label policers 26 operating "within" the logical service of the VPLS instance.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to purchase a service offered by service provider network 12, such as VPLS instance 13, in order to transparently interconnect these networks 14 in the manner described above.

Each of customer networks 14 may operate according to a wide variety of network protocols, such as any of the 802.3x family of network protocols related to the Ethernet protocol, any of the 802.1x family of wireless networking protocols, an Internet Protocol (IP) protocol, and a Transmission Control Protocol (TCP). Moreover, one or more of customer networks 14 may comprise a Virtual Private Network (VPN), a Local Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 may include a plurality of provider edge (PE) routers 16A-16C ("PEs 16") that reside at an edge of service provider network 12. While discussed herein with respect to a particular network device, i.e., a router, PEs 16 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality.

PEs 16 couple to respective customer networks 14 via attachment circuits 20A-20C ("ACs 20"). Each of ACs 20 is a physical or virtual circuit attaching a respective customer network 14 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each comprise a direct link or an access network.

PEs 16 may provide one or more services, such as the illustrated VPLS instance 13, to transparently interconnect customer networks 14 to one another. To continue the above example, the large entity may own and operate each of customer networks 14 and contract the service provider to provide VPLS instance 13 to transparently interconnect each of these customer networks 14 to one another via service provider network 12. In this case, PE 16A may emulate a direct connection in accordance with VPLS instance 13 to both of customer networks 14B, 14C such that these customer networks may operate as if both directly connected to customer network 14A. Likewise, PE 16B may emulate a direct connection in accordance with VPLS instance 13 to both of customer networks 14A, 14C such that these customer network may operate as if both directly connected to customer network 14B. Each of customer networks 14 may also include a respective one or more customer edge (CE) devices (not shown) located at a provider-facing edge of the corresponding one of customer networks 14. The devices may each represent any network device that interfaces with a network, such as service provider network 12, to route, switch or otherwise forward network traffic directed to or received from the network.

This form of interconnection is referred to as "full mesh" in that a VPLS provides logical point-to-point connectivity between each of a set of customer networks 14. The full mesh form of interconnection is illustrated in FIG. 1 as three bi-directional service links 22A-22C ("service links 22") that transport customer L2 communications between PEs 16. Service links 22 are illustrated in FIG. 1 as dashed lines to reflect that these may not directly couple PEs 16 to one another, but may be transported over one or more physical links and intermediate network devices that form each of service links 22. While assumed for ease of illustration purposes to be configured in this full mesh manner, customer networks 14 may interconnect with one another via any other form of interconnection, and service links 22 may be bi-directional or unidirectional to suit any particular form of interconnection. Each of service links 22 may be implemented as a pseudowire. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein.

In some cases, packet-switched network (PSN) transport tunnels may be established between PEs 16 to carrying pseudowires for multiple VPLS instances within network 10. For example, customer L2 traffic encapsulated for transport along service link 22A in service packets may be further encapsulated for transport in a transport tunnel established between PEs 16A, 16B. While generally described in this document as an MPLS LSP, transport tunnels may also include Generic Route Encapsulation (GRE), L2TP, and IPsec tunnels. In this way, a particular PSN tunnel may deliver service packets for multiple service links for multiple VPLS instances, including any of service links 22. To disambiguate among the VPLS instances for which service links are established, service packets each carry a service link demultiplexer that identifies the service link in the data plane of PEs 16. A service link demultiplexer may comprise an MPLS label, an L2TP session identifier, or a UDP port number, for example. Hereinafter, service link demultiplexers will be described for exemplary purposes with respect to "pseudowire labels" to reflect a common implementation in which service links 22 are pseudowires. Pseudowires labels need not be unique to each of PEs 16; however, because the pseudowire labels disambiguate service packets over a PSN tunnel, they must be at least unique at the PSN tunnel endpoint. For example, the same pseudowire label may disambiguate VPLS instance 13 provided for customer networks 14 for both service links 22A, 22C at PE 16A. The same or different pseudowire labels may be used for both directions of a particular one of service links 22.

An administrator of service provider network 12 may configure or PEs 16 may cooperatively establish service links 22 for the VPLS instance, and once established, PEs 16 begin emulating the direct connection between customer networks 14 using service links 22, thus implementing an emulated service that terminates at the customer edges. Each of PEs 16 for each of the service links 22 endpoints is configured with the particular pseudowire label that identifies received service packets for VPLS instance 13 in the data plane, as well as with the particular pseudowire label that the PE is to attach to service traffic to specify the service traffic for VPLS instance 13 to the data plane of the receiving PE. For example, PE 16A may be configured to attach pseudowire label "100" to specify service link 22A traffic over a PSN tunnel to PE 16B. PE 16A may be further configured with pseudowire label "200" that, when attached to service packets received in a PSN tunnel from PE 16B, identifies the traffic as service link 22A traffic.

Customer networks 14 forward L2 traffic via respective ACs 20 to corresponding PEs 16, which attach the appropriate pseudowire label to the L2 traffic to generate service packets and forward the service packets through service provider network 12 via selected ones of service links 22 in accordance with the VPLS instance. Receiving PEs 16 identify VPLS instance 13 using the attached pseudowire labels and, in accordance with the VPLS instance, transparently deliver the L2 traffic via ACs 20 to the other ones of customer networks 14. In this manner, a large entity may use VPLS instance 13 of service provider network 12 to interconnect disparate and often geographically separate customer networks 14. In some instances, network system 10 may include additional customer networks 14 for which service provider network 12 provides one or more VPLS instances to interconnect the customer networks 14 in various combinations. Each VPLS instance requires a distinct, full mesh of service links (e.g., a full mesh of pseudowires interconnecting participating PEs).

In the illustrated example, customer network 14A forwards L2 traffic 24 over attachment circuit 20A. L2 traffic 24 includes broadcast, multicast, or unidentified unicast (i.e, "BUM") traffic that is replicated by VPLS instance 13 at PE 16A and sent over multiple service links 22A, 22C to respective PEs 16B, 16C for delivery to respective customer networks 14B, 14C and interested devices therein. In general, broadcast and multicast traffic includes traffic delivered by a L2 network to multiple interested recipients, while unidentified unicast traffic is unicast traffic with one interested recipient for which the L2 network location is unknown and that is therefore broadcast by the L2 network to attempt to reach the interested recipient.

In accordance with the described techniques, each of PEs 16 comprises a respective one of pseudowire label policers 26A-26C ("PLPs 26") to monitor each of service links 22 for which the PE comprises an endpoint and to maintain respective counters for the number of service packets for the service link transmitted and received at the endpoint. For example, PE 16A comprises PLP 26A that monitors service links 22A, 22C and includes a respective pair of transmit/receipt counters for each of the monitored PWs. When PE 16A receives a service packet for forwarding that is labeled to identify the service packet with service link 22A, PLP 26A increments the receipt counter for PW 22A. Similarly, when PE 16A transmits a service packet over service link 22A, PLP 26A increments the transmit counter for service link 22A. In this way, PLPs 26 track the number of service packets transmitted and received by each endpoint of service links 22 for the illustrated VPLS instance.

In the example illustrating forwarding of L2 traffic 24 by PE 16 implementing a VPLS instance, PLP 26A increments the respective transmit counters for service links 22A, 22C upon PE 16A forwarding L2 traffic 24 within the service links to PEs 16B, 16C. At the other endpoint of the service link 22A, PLP 26B receives L2 traffic 24 from the service link and increments the receipt counter maintained by PLP 26B for service link 22A. Similarly, at the other endpoint of the service link 22C, PLP 26C receives L2 traffic 24 from the service link and increments the receipt counter maintained by PLP 26C for service link 22C.

Network management system 8 communicates with PEs 16 via network system 10 to manage and oversee the PEs using a device management protocol. One example device protocol is the Simple Network Management Protocol (SNMP) that allows network management system 8 to traverse and modify management information bases (MIBs) that store configuration and performance data within each of PEs 16. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, the entire contents of which are incorporated herein by reference.

PEs 16 store an associated transmit and receipt counter for each endpoint of each of service links 22 and increment the appropriate counter upon transmission or receipt of service packets at the service endpoints. PEs 16 may therefore compute service packet loss for each direction of each of service links 22 by determining the difference between the transmit counter at the ingress endpoint of the directional service link and the receipt counter at the egress endpoint of the directional service link. PEs 16 at corresponding endpoints for each of service links 22 perform service packet loss measurement by exchanging counter data in one or more control messages to enable one of the PEs 16 implementing a service link endpoint to compute the difference between the transmit counter and receipt counter for each direction of the service link.

For example, PE 16C may send PE 16A the receipt counter and transmit counter for the endpoint of service link 22C comprised by PE 16C. PE 16A computes a far-end packet loss for service link 22C as the difference between the received receipt counter and the transmit counter for the endpoint of service link 22C comprised by PE 16A, where far-end packet loss refers to the number of service packets sent by PE 16A over service link 22C but not received by PE 16C. PE 16A computes a near-end packet loss for service link 22C as the difference between the received transmit counter and the receipt counter for the endpoint of service link 22C comprised by PE 16A, where near-end packet loss refers to the number of service packets sent by PE 16C over service link 22C but not received by PE 16A.

Network management system 8 may periodically, or under direction by an administrator, request service link performance data including service packet loss data for service links 22 from PEs 16. PEs 16 perform the pseudowire label policing and packet loss measurement techniques described above to provide packet loss data for PWs 22 to network management system 8 responsive to the requests or, in some instances, periodically or upon occurrence of a defined event. PEs 16 may return, in addition to near-end and/or far-end service packet loss data for a particular service links 22 endpoint, the appropriate transmit counter data for the PW endpoint to enable network management system 8 to compute a packet loss ratio.

Conventional loss measurement techniques for L2 networks (including L2VPNs), as recommended in ITU-T Y.1731 for example, monitor PDU loss at service endpoints to determine end-to-end per-service-instance Ethernet layer operation, administration, and management (OAM). For a VPLS instance, the VPLS service endpoints are the customer edges (CE) devices or CE-facing interfaces of PE devices that originate and/or terminate the emulated LAN. Because VPLS is a multipoint-to-multipoint (MP2MP) service to emulate the MP2MP connectivity attribute of a LAN, when a particular PDU received from a customer network represents broadcast, multicast, or unidentified unicast (that is, "BUM traffic"), an ingress PE device may inject the PDU into the VPLS service, which in turn may issue the PDU over multiple service links of VPLS instance 13 that provide emulated L2 connectivity from the ingress PE device to multiple egress PE devices that serve respective customer network sites. The PDU may therefore be counted as received from the VPLS service by each of the multiple egress VPLS service endpoints. However, the PDU is counted as transmitted only once at the ingress VPLS service endpoint. Conventional loss measurement techniques do not provide a mechanism with which to correlate particular PDUs input to the service with particular PDUs output by the service and, in the case of BUM traffic, transmit counters may therefore not account for every PDU By contrast, PLPs 26A track the number of service packets transmitted and received at pseudowire endpoints of service links 22 while remaining within the VPLS instance. This allows per-pseudowire loss measurement to be tracked and reported within the VPLS instance, even for BUM traffic. As such, any divergence between a number of PDUs transmitted and a number of PDUs received is due to service packet (and correlated PDU) loss along an individual service link, rather than to overcounting transmitted BUM PDUs at the customer-facing Ethernet service points after egress of the VPLS instance. As a result, the techniques may improve loss measurement accuracy within a VPLS instance. These more accurate loss measurements for VPLS instance 13 may also, for example, improve the ability of the service provider of network 12 to verify to the customer networks 14 customer that operation of VPLS instance 13 meets the performance requirements of an SLA between the customer and the provider.

Figure 2:
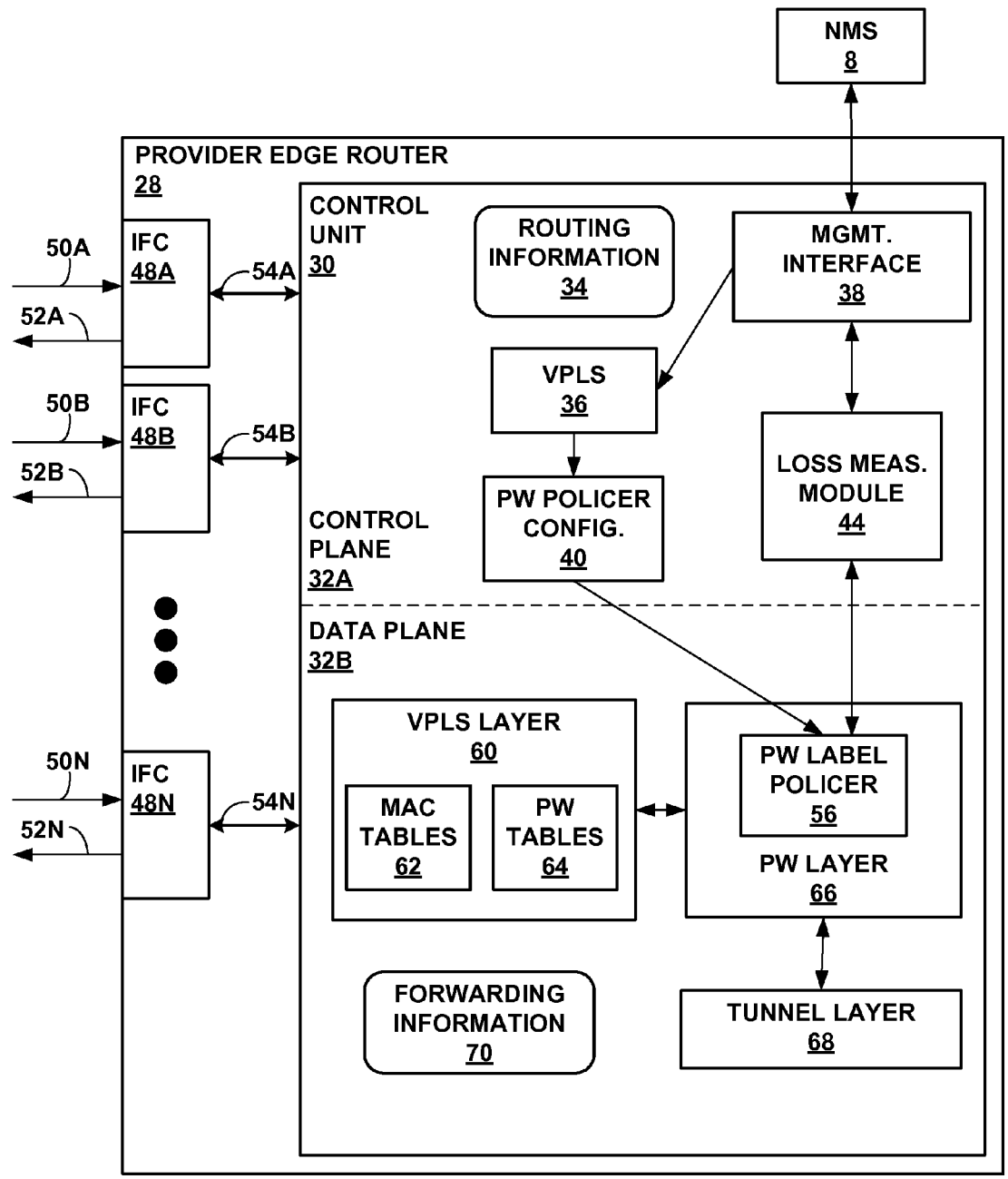
FIG. 2 is a block diagram illustrating an example provider edge router that performs the pseudowire label policing and loss measurement techniques described in this disclosure.

FIG. 2 is a block diagram illustrating an example provider edge router 28 (hereinafter, "router 28") that performs the pseudowire label policing and loss measurement techniques described herein. For purposes of illustration, router 28 may be described below within the context of an exemplary network system 10 of FIG. 1 that implements service links 22 with pseudowires and may represent any one of PEs 16. Moreover, while described with respect to a particular network device, e.g., a router, the techniques may be implemented by any network device that may operate as a pseudowire endpoint. The techniques should therefore not be limited to the exemplary embodiments described in this disclosure.

As shown in FIG. 2, router 28 includes a control unit 30 and interface cards 48A-48N ("IFCs 48") coupled to control unit 30 via internal links 54A-54N. Control unit 30 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 30 is divided into two logical or physical "planes" to include a first control or routing plane 32A and a second data or forwarding plane 32B. That is, control unit 30 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 executes the routing functionality of router 28. In this respect, control plane 32A represents hardware or a combination of hardware and software of control unit 30 that implements routing protocols (not shown in FIG. 2) by which routing information 34 may be determined. Routing information 34 may include information defining a topology of a network, such as SP network 10. Control plane 32A may resolve the topology defined by routing information 34 to select or determine one or more routes through the network. Control plane 32A may then update data plane 32B with these routes, where data plane 32B maintains these routes as forwarding information 70. Forwarding or data plane 32B represents hardware or a combination of hardware and software of control unit 30 that forwards network traffic in accordance with forwarding information 70.

Control plane 32A further comprises management interface 38 (illustrated as "mgmt. interface 38") by which network management system 8 (illustrated as "NMS 8"), or in some instances an administrator using a command line or graphical user interface, configures in VPLS module 36 ("VPLS 36") one or more VPLS instances for a network to interconnect combinations of Ethernet customer networks into a single Ethernet domain using pseudowires. For example, network management system 8 may configure router 28 as a participant in a particular VPLS instance, such as VPLS instance 13 of FIG. 1, having an associated VPLS identifier. VPLS module 36 may perform auto-discovery to determine additional PE routers participating in a VPLS instance and additionally performing signaling to establish a full mesh of a pseudowire between PE 28 and each of the additional PE routers. VPLS module 36 may execute Label Distribution Protocol (LDP)- and/or Border Gateway Protocol (BGP)-based techniques to perform the auto-discovery and signaling.

Each established pseudowire is associated with an inbound pseudowire label, an outbound pseudowire label, an associated pseudowire identity. Upon establishing pseudowires for a VPLS instance, VPLS module 36 stores pseudowires identities for the pseudowires in one of pseudowire tables 64 ("PW tables 64") in data plane 32B for the VPLS instance and also associates pseudowire label information with the pseudowire identities in pseudowire layer 66.

Data plane 32B provides high-speed forwarding of network traffic received by interface cards 48 via inbound links 50A-50N. VPLS layer 60, pseudowire layer 66 (illustrated as "PW layer 66"), and tunnel layer 68 of data plane 32B process and forward received network traffic associated with VPLS instances in which router 28 participates in accordance with forwarding information 70, MAC tables 62, and PW tables 64. Each of VPLS layer 60, PW layer 66, and tunnel layer 68 represents components of data plane 32B to implement the respective functionality of the layer. For example, VPLS layer 60 represents hardware or a combination of hardware and software to implement virtual switching and other VPLS-related functionality for VPLS instances in which PE router 28 participates.

Tunnel layer 68 provides tunneling services to deliver one or more pseudowires over network 10 to additional routers participating in VPLS instances. A single tunnel may carry one or more pseudowires. VPLS 36 may perform setup, maintenance, and tear-down signaling for tunnels underlying pseudowires of the VPLS instances. Tunnels implemented by tunnel layer 68 may include LSPs as well as GRE, L2TP, and IPsec tunnels. Tunnel layer 68 receives outbound pseudowire traffic and a specified tunnel identifier from pseudowire layer 66 and outputs the traffic in accordance with the specified tunnel. For example, upon receiving a pseudowire packet and a specified outbound MPLS label, tunnel layer 68 may attach the MPLS label to the packet and output the labeled packet via an outbound interface of IFCs 48 bound to the MPLS label in, for example, a label information base or MPLS forwarding table. Tunnel layer 68 delivers pseudowire packets received via a tunnel to pseudowire layer 66.

Pseudowire layer 66 selects VPLS instances to process received pseudowire packets based on the respective pseudowire label of the packet. That is, upon receiving a pseudowire-labeled packet from tunnel layer 68, pseudowire layer 66 strips the pseudowire label from the PDU and selects the VPLS instance associated with the pseudowire identified by the label. In other words, the pseudowire layer 66 uses the attached pseudowire label to demultiplex the PDU for handling by VPLS layer 60 according to the appropriate VPLS instance. Pseudowire layer 66 additionally receives outbound PDUs and pseudowire identities from VPLS layer 60, maps the pseudowire identities to outbound pseudowire labels for the pseudowires, attaches the outbound pseudowire labels to the PDUs, and sends the pseudowire traffic to tunnel layer 68 for output in packet-switched network tunnels that carry the pseudowire.

VPLS layer 60 of data plane 32B implements one or more VPLS instances in which router 28 participates by operating as a virtual bridge or virtual switch to interconnect multiple customer networks over a provider network. VPLS layer 60 performs L2 learning, that is, VPLS layer 60 "learns" customer device L2 addresses (hereinafter, "MAC addresses") from inbound PWs and inbound links 50A-50N of IFCs 48 and association of those customer MAC addresses with corresponding outbound PWs and output links 52A-50N of IFCs 48. For each VPLS instance, VPLS layer 60 includes a respective one of PW tables 64 that stores pseudowire identifies for the VPLS instance as well as a respective one of MAC tables 62 that maps learned L2 addresses to outbound interfaces of IFCs 48 or to pseudowire identities included in the respective PW table for the VPLS instance.

For example, inbound link 50A and outbound link 52A may represent inbound and outbound aspects of an attachment circuit between a customer network and router 28. When router 28 receives an L2 PDU on inbound link 50A, VPLS layer 60 maps the source MAC address to outbound link 52A in MAC tables 62 for the VPLS instance that includes inbound link 50A in the corresponding one of PW tables 64 for the VPLS instance. As another example, when router 28 receives an L2 PDU on a pseudowire, router 28 maps the source MAC address to the pseudowire identifier in MAC tables 62 for the VPLS instance that includes the pseudowire identity in the corresponding one of PW tables 64 for the VPLS instance. In this way, VPLS layer 60 learns outbound interfaces and pseudowires for MAC addresses of customer devices. In some embodiments, aspects of VPLS layer 60 are distributed to control plane 32A.

In accordance with the techniques of the present disclosure, pseudowire layer 66 additionally includes pseudowire label policer 56 ("PW label policer 56") that includes respective transmit and receipt counters for pseudowire terminated at router 28. As used herein, a router "terminates" a pseudowire when it is an ingress or egress router for the pseudowire. Pseudowire policer 56 may represent an embodiment of any one of PLPs 26 of FIG. 1. Pseudowire policer 56 monitors instances of pseudowire traffic by incrementing the respective counters for a pseudowire upon transmitting or receiving pseudowire traffic having corresponding labels for the pseudowire. For example, one of PW tables 64 for a VPLS instance may include a pseudowire identifier "PW_1" that pseudowire layer 66 maps to inbound and outbound pseudowire labels "100" and "200," respectively. When pseudowire layer 66 attaches pseudowire label 200 to an outbound PDU, PW label policer 56 increments the transmit counter for PW_1. Likewise, when pseudowire layer 66 receives pseudowire traffic having attached pseudowire label 100, PW label policer 56 increments the receipt counter for PW_1. In this way, PW label policer 56 may be viewed as operating within the VPLS instance by maintaining transmit and receipt statistics for L2 PDUs with pseudowire-level specificity rather than logically external to the VPLS instance where statistics are maintained on a basis of a service instance or tunnel identity, for example.

In some embodiments, aspects of data plane 32B are distributed to a number of distributed forwarding units, such as packet forwarding engines, each associated with a different one or more IFCs 48. In these embodiments, PW label policer 56 may be distributed to the distributed forwarding units to enable high-speed PW label counting within the data plane.

Control plane 32A also includes pseudowire label policer configuration module 40 (illustrated as "PW label policer config. 40") that receives pseudowire label associations for pseudowires from VPLS 36 and establishes new transmit and receipt counters, when necessary, in PW label policer 56 for the pseudowire labels associated with the pseudowires. As a result, PW label policer 56 may include counters for each pseudowire terminated by router 28 for the various VPLS instances in which router 28 participates.

Loss measurement module 44 (illustrated as "loss meas. module 44") of control plane 32A determines pseudowire packet loss for pseudowires terminated by router 28. In one example, loss measurement module 44 reads transmit and receipt counter values of PW label policer 56 for the terminated pseudowires and additionally receives remote transmit and receipt counter values for the pseudowires from other routers that terminate the other ends of the pseudowires. Using the read and received counter values, loss measurement module 44 computes, for a pseudowire, pseudowire PDU loss measurement statistics based on the differences between transmit and receipt counter values for each direction of the pseudowire.

Loss measurement module 44 may establish, for example, a transmission control protocol (TCP) session or other high-layer session with the additional routers to exchange messages to obtain remote counter values for the pseudowires. In some examples, loss measurement module 44 injects loss measurement control PDUs into pseudowires at PW layer 66 and receives loss measurement control PDUs filtered at PW layer 66 to control plane 32A in order to exchange messages with the additional routers to obtain remote counter values for the pseudowires. The injected and filtered loss measurement control PDUs may carry counter values specific to the pseudowires that carry the PDUs. That is, each pseudowire may in some instances only carry loss measurement control PDUs that have counter values associated with the pseudowire. Loss measurement module 44 provides computed PDU pseudowire loss measurement statistics for the pseudowires to NMS 8 via management interface 38. In various aspects, loss measurement module 44 may perform pseudowire PDU loss measurement determination techniques autonomously or responsive to requests from NMS 8 via management interface 38. As a result, router 28 operating according to the techniques of this disclosure may accurately provide to NMS 8 PDU loss measurement statistics for each pseudowire of VPLS instances in which router 28 participates. NMS 8 may thus use the pseudowire-specific PDU loss measurement statistics for the VPLS instances to determine an accurate, overall PDU loss for any particular VPLS instance in which router 28 participates.

Figure 3:
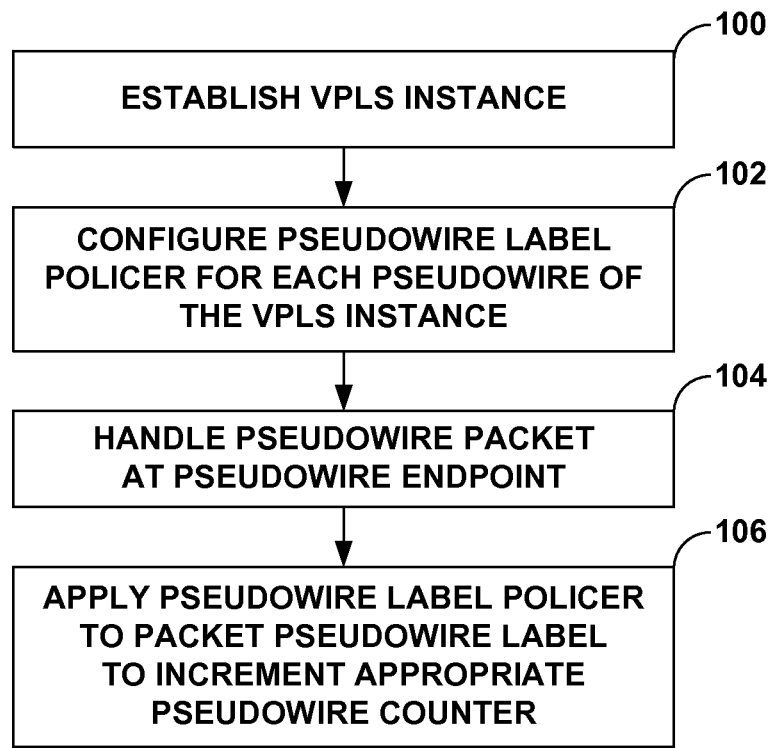
FIG. 3 is a flowchart illustrating an example operation of the router of FIG. 2 to establish a VPLS instance and a pseudowire policer to monitor pseudowire traffic at the router for the VPLS instance in accordance with the techniques described herein.

FIG. 3 is a flow chart illustrating an example operation of router 28 of FIG. 2 to establish a VPLS instance and PW label policer 56 to monitor pseudowire-specific traffic at router 28 for the VPLS instance in accordance with the techniques described herein. VPLS 36 of router 28 establishes a VPLS instance in which router 28 participates by configuring, using distributed signaling techniques or under direction by an administrator for example, pseudowires for the VPLS instance that router 28 terminates (100). VPLS 36 provides associated outbound and inbound pseudowire labels for each of the pseudowires of the VPLS instance to pseudowire label policer configuration module 40, which configures pseudowire label policer 56 to establish respective transmit and receipt counters for the outbound and inbound pseudowire labels for each of the pseudowires (102).

When pseudowire layer 66 of router 28, operating as endpoints for the pseudowires of the VPLS instance, receives a PDU for transmission at a pseudowire ingress endpoint or receives a pseudowire packet at a pseudowire egress endpoint, pseudowire layer 66 handles the PDU or pseudowire packet in accordance with the appropriate pseudowire label (104). That is, pseudowire layer 66 attaches the outbound pseudowire label for the pseudowire to the PDU or strips the inbound pseudowire label of the received pseudowire packet for use in demultiplexing to a VPLS instance implemented in VPLS layer 60. PW label policer 56 increments the counter for the relevant inbound or outbound pseudowire label for the operation to track the pseudowire packets transmitted and received (106).

Figure 4:
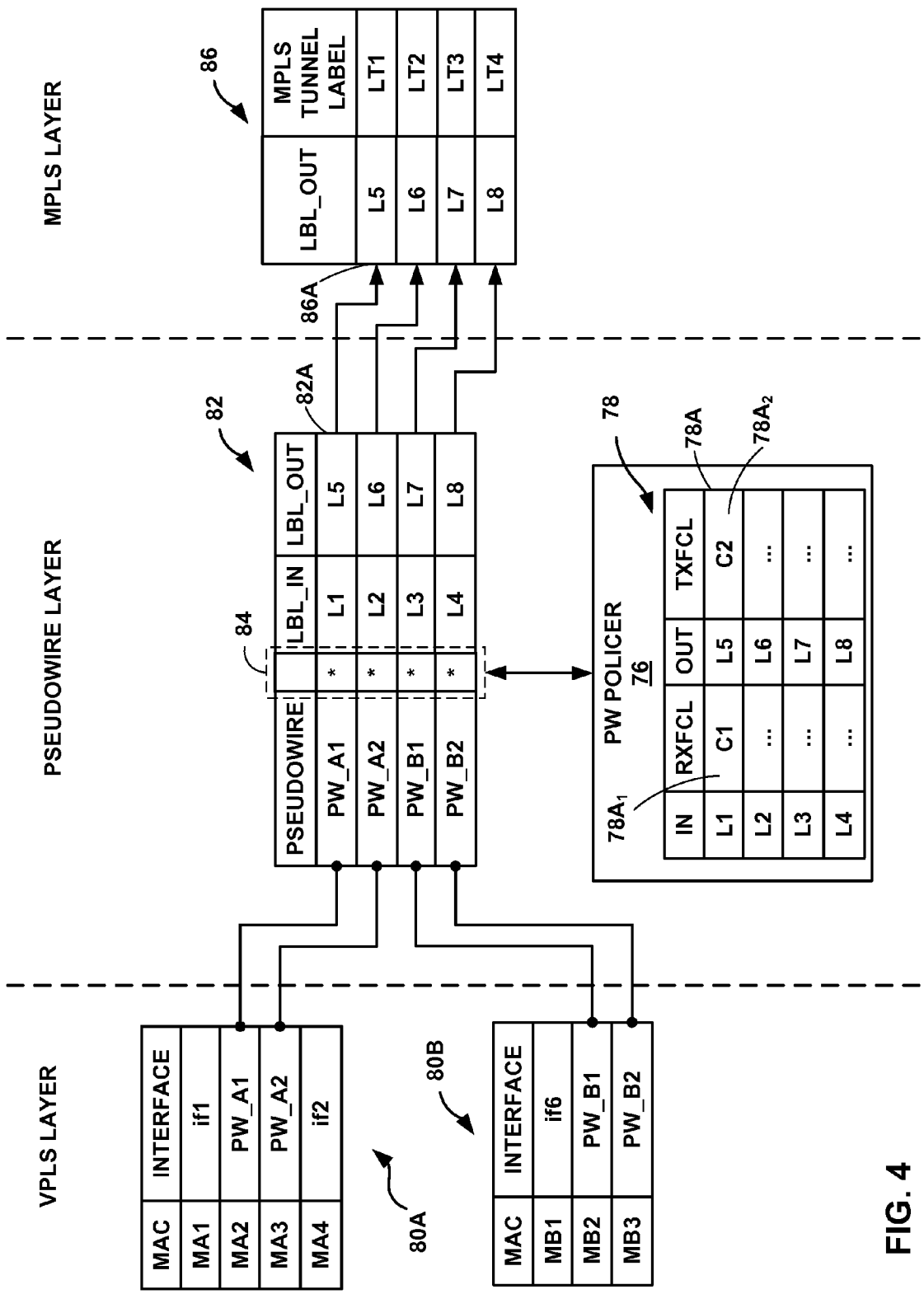
FIG. 4 is a block diagram illustrating example data structures for a network device that implements pseudowire loss measurement techniques described in this disclosure.

FIG. 4 is a block diagram illustrating example data structures for a network device that implements pseudowire loss measurement techniques described in this disclosure. The network device may represent an example embodiment of any of PEs 16 of FIG. 1 or router 28 of FIG. 2. FIG. 4 logically divides the data structures according to VPLS, pseudowire, and MPLS layers that correspond to the VPLS, pseudowire, and tunnel layers of router 28 of FIG. 1. The illustrated data structures may represent packet forwarding information that is distributed to forwarding components (e.g., data plane 32B) of a plurality of packet forwarding units of the network device, and so represent a topology of the packet forwarding information for VPLS instances within the network device. Various embodiments of the forwarding components of the network device may use different data structures to represent the illustrated associative data. For example, MAC tables 80 may incorporate outbound label and MPLS tunnel label information for pseudowire interfaces.

In the illustrated embodiment, the VPLS layer includes MAC tables 80A-80B ("MAC tables 80") that each represents a MAC table for a respective VPLS instance in which the network device participates. Each of MAC tables 80 map MAC addresses of network devices in an L2 network for which the network device operates as a virtual bridge, or virtual switch, to implement the corresponding VPLS instance. Specifically, MAC tables 80 map MAC addresses to interfaces or pseudowires of the network device. For example, MAC table 80A maps MAC address "MA1" to interface if1, which may represent an attachment circuit that couples the network device to a customer network. Mapped interfaces may comprise logical or physical interfaces or the network device. As another example, MAC table 80A maps MAC address "MA2" to pseudowire "PW_A1." Mapped pseudowires may be identified using a pseudowire identifier or a pseudowire label, for instance. For example, in some embodiments, MAC table 80A may map MAC address "MA2" to outbound label L5 for pseudowire "PW_A1." The network device installs MAC table mappings learned during operation of a VPLS instance to the corresponding one of MAC tables 80.

Pseudowire label table 82 of the pseudowire layer associates inbound pseudowire labels ("LBL_IN" column) and outbound pseudowire labels ("LBL_OUT" column) with pseudowire identifiers ("PSEUDOWIRE" column). For example, pseudowire label table entry 82A associates inbound pseudowire label L1 and outbound pseudowire label L5 to the pseudowire identified as "PW_A1." Label-switched path (LSP) table 86 maps outbound pseudowire labels to LSPs for which the network device is a label edge router (LER). LSP table 86 may in some instances also include mapped outbound interfaces for the LSPs.

In an example operation to transmit, according to a VPLS instance, a PDU received from a customer network over a pseudowire to another customer network, the forwarding components of the network device perform a forwarding lookup and attempt to map the destination MAC address for the PDU to an interface in the one of MAC tables 80 for the instance. If the destination MAC is not mapped, the network device outputs the PDU over all pseudowires of the VPLS instance. If the destination MAC is mapped, the forwarding components of the network device output the PDU over the mapped pseudowire by first attaching the outbound pseudowire label associated with the mapped pseudowire in pseudowire label table 82. The forwarding components of the network device then perform a chain-next hop based on the pseudowire label and attaches the MPLS tunnel label mapped to the outbound pseudowire label, thereby forming the encapsulated packet for output over a transport LSP. When the forwarding components of the network device receive pseudowire traffic having an inbound pseudowire label, the forwarding components perform a lookup within pseudowire label table 82 and determines an associated pseudowire identifier for the inbound pseudowire label and a VPLS instance associated with the pseudowire identifier. The network device may output the decapsulated PDUs from the pseudowire traffic to a customer-facing interface, if specified by one of MAC tables 80 for the VPLS instance.

In accordance with the described techniques, pseudowire label table 82 also includes policer reference column 84 that specifies transmit and receipt counters for pseudowires to pseudowire policer 76. Pseudowire policer 76 may represent an example embodiment of any of PLPs 26 of FIG. 1 or pseudowire policer 56 of FIG. 2 and includes pseudowire label counters table 78 having transmit ("TXFCL" column) and receipt ("RXFLC" column) counters for corresponding pseudowires. Policer reference column 84 may specify, for example, references, pointers, or indices that resolve to entries of pseudowire label counters table 78. During operation of the pseudowire layer of the forwarding component to demultiplex a received pseudowire packet or form an outbound pseudowire packet prior to egressing the pseudowire packet from the VPLS instance, the forwarding component invokes the PW label policer 76 and resolves the policer reference column 84 entry for the pseudowire in pseudowire label table 82 to an entry in pseudowire label counters table 78. In this way, PW label policer 76 may be invoked during an intermediate point within a next hop chaining process performed by the forwarding component so as to ensure that the counters are updated within the VPLS instance, thereby providing statistics on a per-pseudowire basis within the VPLS service. Further details relating to next hop chaining may be found in application Ser. No. 12/266,298, filed on Nov. 6, 2008, entitled "PLATFORM-INDEPENDENT CONTROL PLANE AND LOWER-LEVEL DERIVATION OF FORWARDING STRUCTURES," and application Ser. No. 12/195,686, filed on Aug. 21, 2008, entitled "NEXT HOP CHAINING FOR FORWARDING DATA IN A NETWORK SWITCHING DEVICE," the entire contents of both of which are incorporated by reference herein.

In the illustrated example, the policer reference column 84 field for pseudowire label table entry 82A resolves to pseudowire label counters table entry 78A having receipt counter $78A_1$ and transmit counter $78A_2$. Thus, when the network device receives pseudowire packets with inbound label L1, PW label policer 76 maps the label to pseudowire "PW_A1" in pseudowire label table 82 and resolves the policer reference column 84 entry for the pseudowire "PW_A1" to pseudowire label counters table entry 78A. PW label policer 76 then increments receipt counter $78A_1$. Similarly, when the network device transmits packets with outbound label L5, PW label policer 76 resolves the policer reference column 84 entry for the pseudowire "PW_A1" to pseudowire label counters table entry 78A and increments transmit counter $78A_2$. The illustrated example data structures thus enable PW label policer 76 to track pseudowire traffic in a pseudowire-specific manner.

Figure 5:
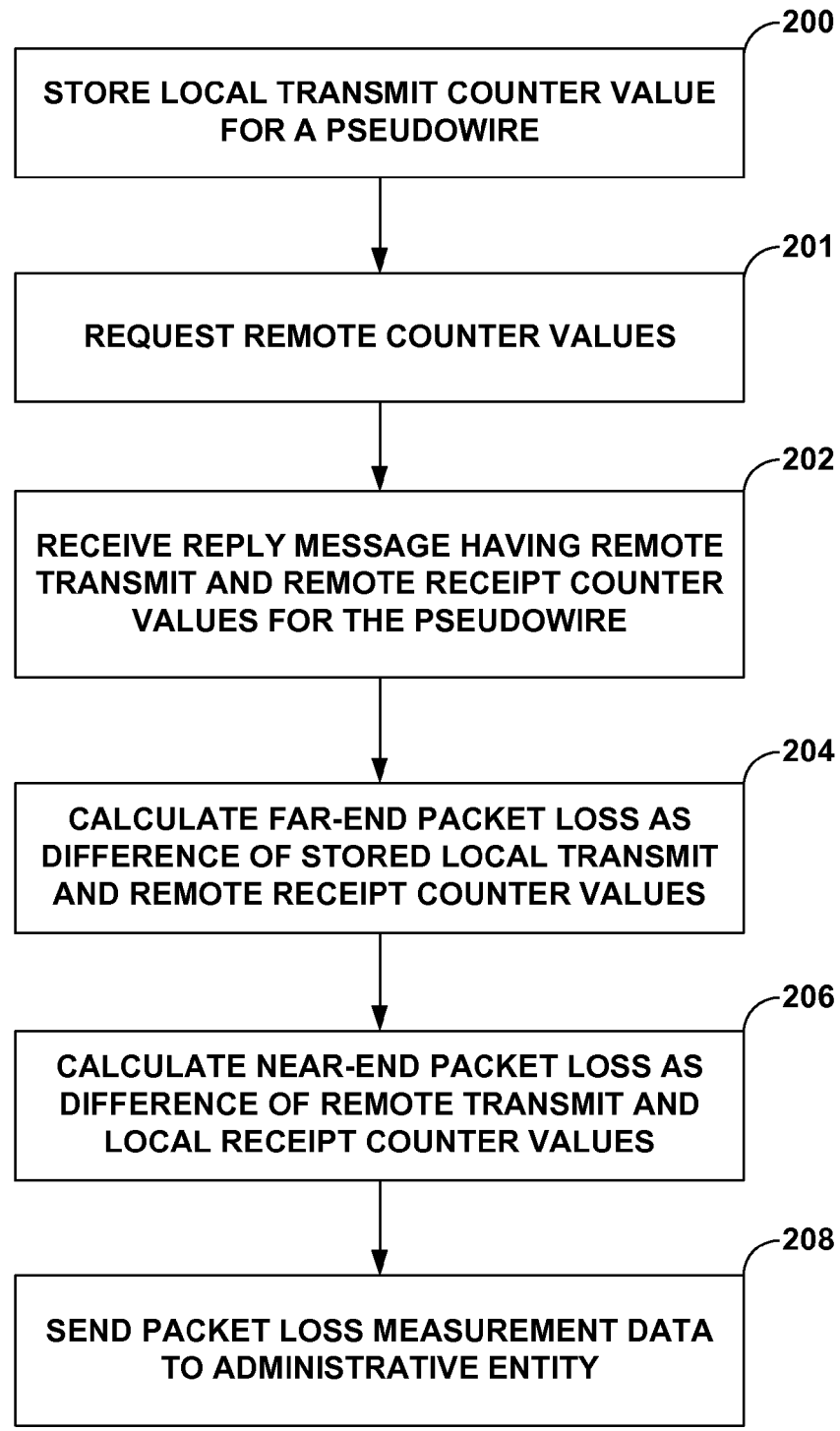
FIG. 5 is a flow chart illustrating an example mode of operation of the router of FIG. 2 to exchange pseudowire label counter data with a remote router for a pseudowire and compute pseudowire packet loss measurement according to the described techniques.

FIG. 5 is a flow chart illustrating an example mode of operation of router 28 of FIG. 2 to exchange pseudowire label counter data with a remote router for a pseudowire and compute pseudowire packet loss measurement according to the techniques of this disclosure. Initially, loss measurement module 44 reads a local transmit pseudowire label counter value for a pseudowire and stores the value to a non-transitory computer-readable medium (200). Loss measurement module 44 then establishes a communication session, if necessary, and issues a request message to the remote router that comprises an endpoint for the pseudowire (201). Loss measurement module 44 receives, from the remote router, a reply message that includes remote transmit and receipt pseudowire label counter values for the pseudowire (202).

Upon receiving the reply message, loss measurement module 44 calculates the far-end packet loss for the pseudowire (i.e., packets lost while traversing the pseudowire from router 28 to the remote router) as the difference of the stored local transmit counter value and the remote receipt counter value received from the remote router (204). Loss measurement module 44 additionally calculates the near-end packet loss for the pseudowire (i.e., packets lost while traversing the pseudowire from the remote router to router 28) as the difference of the remote transmit counter value received from the remote router and the local receipt counter value (206). Loss measurement module 44 sends packet loss measurement data to NMS 8 via management interface 38 (208). Packet loss measurement data may include near-end and far-end packet loss, a number of transmitted packets for each direction of the pseudowire since the previous loss measurement request/reply iteration, and/or a computed packet loss ratio for each direction of the pseudowire, for example. In some instances, loss measurement module 44 stores the remote transmit counter value for use in a future request/reply iteration in computing packet loss ratio or providing a number of packets transmitted from the remote router to router 28 over the pseudowire.

Figure 6:
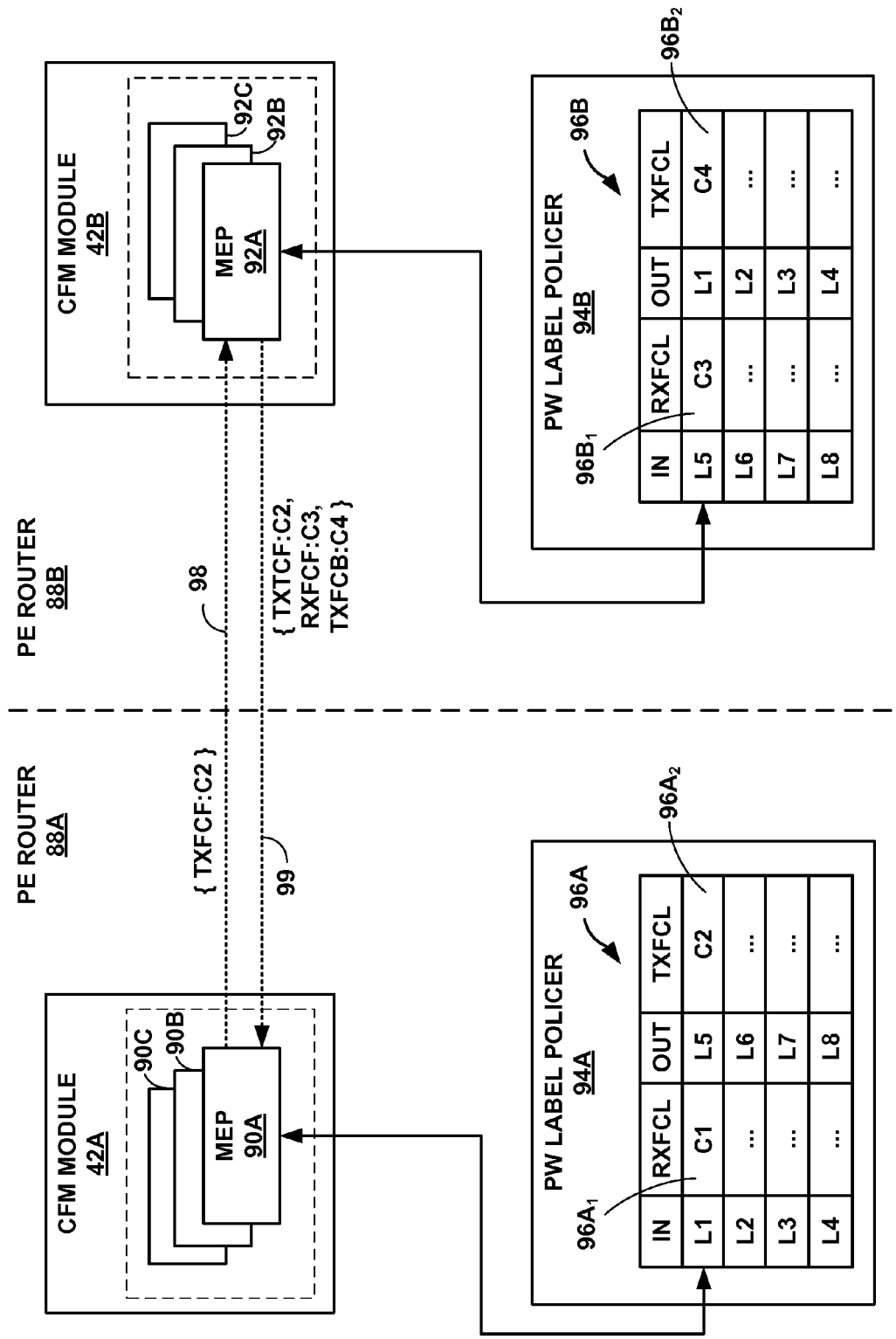
FIG. 6 is a block diagram illustrating Connectivity Fault Management modules and pseudowire label policers that monitor pseudowire traffic and exchange pseudowire label counter data to provide pseudowire packet loss measurement results in accordance with the techniques described herein.

FIG. 6 is a block diagram illustrating Connectivity Fault Management ("CFM") modules 42A, 42B ("CFM modules 42") and PW label policers 94A, 94B ("PW label policers 94") of respective PE routers 88A, 88B ("PE routers 88") that monitor pseudowire traffic and exchange pseudowire label counter data to provide pseudowire packet loss measurement results in accordance with the techniques described herein. PE routers 88A, 88B may each represent any of PEs 16 of FIG. 1 or PE router 28 of FIG. 2. PW label policers 94A, 94B may each represent any of PLPs 26 of FIG. 1 or PW label policer 76 of FIG. 4. CFM modules 42 may each represent loss measurement module 44 of FIG. 2.

Conventional maintenance entities (MEs), as described for example in ITU-T Y.1731 incorporated above, refer to a single point-to-point (P2P) Ethernet connection, such as that provided at the customer-facing interfaces of a virtual circuit to implement a P2P L2VPN. A multipoint-to-multipoint (MP2MP) Ethernet connection, such as that provided by a VPLS over a service provider network, includes a number of maintenance entities that each represents a P2P Ethernet connection within the MP2MP Ethernet connection. Each ME in an MP2MP Ethernet connection terminates at one of the points of the Ethernet connection. That is, multiple MEs may terminate at a single service point. Moreover, conventional MEPs that apply OAM techniques do not have a mechanism for correlating ingress Ethernet traffic at an inbound Ethernet connection for a MEG that includes the MEPs with particular egress Ethernet traffic at an outbound Ethernet connection for the MEG. As a result, Ethernet traffic that is replicated by the provider of the Ethernet service may be inaccurately counted multiple times at various egress MEPs that all connect to single ingress MEP for the MP2MP Ethernet connection.

CFM modules 42 includes respective maintenance entity group endpoints (MEPs) 90A-90C and 92A-92C ("MEPs 90, 92") that each mark the endpoint of a pseudowire in which the corresponding one of PE routers 88 participates. In this way, MEPs 90, 92 differ from conventional MEPs by monitoring and exchanging loss measurement data for L2 traffic at the pseudowire level, rather than at the level of the Ethernet service/connection.

MEPs 90A and 92A are MEPs for a pseudowire that connects PE routers 88 for a particular instance of an L2VPN, such as a VPLS instance. PW label policers 94 perform the pseudowire label monitoring techniques described above to track pseudowire packets on a pseudowire-specific basis by incrementing counter fields of a corresponding one of pseudowire label counters tables 96A, 96B.

MEPs 90, 92 exchange pseudowire label counter values to measure pseudowire packet loss using the messaging protocol described in ITU-T Y.1731. MEPs 90, 92 may perform single-ended and/or dual-ended pseudowire loss measurement. Moreover, while MEPs 90, 92 may perform proactive and/or periodic loss measurement, the techniques are described with respect to periodic loss measurement for single-ended, on-demand OAM in which MEP 90A and MEP 92A exchange loss measurement messages (LMMs) and loss measurement replies (LMRs) having embedded pseudowire label counter values.

MEP 90A initiates an on-demand loss measurement by issuing LMM 98 in-profile to MEP 92A. That is, MEP 90A sends LMM 98 to MEP 92A over the pseudowire for which the MEPs operate as endpoints. LMM 98 includes TxFCf value C2, the value of local transmission counter (TxFCL) $96A_2$ for the pseudowire at the time MEP 90A issues LMM 98. Responsive to receiving LMM 98, MEP 92A issues LMR 99 that includes TxTCf value C2 copied from the TxFCf value of LMM 98; RxFCf value C3, the value of remote receipt counter (RxFC1) $96B_1$ at the time of LMM 98 reception; and TxFCb value C4, the value of remote transmission counter (TxFC1) $96B_2$ at the time of LMR 99 transmission.

In this way, the MEPs 90, 92 replace conventional Ethernet service counter values with pseudowire policer counter values. In some instances, MEPs 90, 92 issue LMMs/LMRs that have an Opcode or Version number that identifies the messages as carrying pseudowire policer counter values. In some instances, MEPs 90, 92 issue LMMs/LMRs having appended Type-Length-Value fields that carry the pseudowire policer counter values. In this way, MEPs 90, 92 may disambiguate conventional LMMs/LMRs from LMMs/LMRs formed according to the described techniques. MEPs 90, 92 may exchange LMMs/LMRs in-profile or in a separate communication session between PE routers 88.

Upon receipt of LMR 99, MEP 90A obtains RxFC1 value C1, the value of local receipt counter (RxFC1) $96A_1$ at the time of LMR receipt. MEP 90A thus has values for each of the remote counters for the pseudowire from MEP 92A and values for the local counters from the pseudowire as maintained by PW label policer 94A. These values are TxFCf[tc], RxFCf[tc], TxFCb[tc], and RxFC1[tc], where tc is the reception time of LMR 99. Because MEPs 90A, 92A exchange LMM 98 and LMR 99 periodically, MEP 90A also stores counter values for a previous iteration. That is, MEP 90A has values for the remote and local counters for the pseudowire from the prior period. Specifically, MEP 90A stores TxFCf[tp], RxFCf[tp], TxFCb[tp], and RxFC1[tp], where tp is the reception time by MEP 90A of the LMR prior to LMR 99.

MEP 90A computes pseudowire packet loss based on the values for the local and remote counters. In example, MEP 90A computes pseudowire packet loss according to techniques described in ITU-T Y.1731. That is, MEP 90A computes far-end packet loss (i.e., packets lost while traversing the pseudowire from PE router 88A to PE router 88B) as |TxFCf[tc]−TxFCf[tp]|−|RxFCf[tc]−RxFCf[tp]|. MEP 90A additionally computer near-end packet loss (i.e., packets lost while traversing the pseudowire from PE router 88B to PE router 88A) as |TxFCb[tc]−TxFCb[tp]|−|RxFC1[tc]−RxFC1[tp]|.

CFM module 42A provides near-end and far-end pseudowire packet loss data computed by MEP 90A according to the described techniques to an administrative entity (e.g., a network management system) to, for example, validate a service-level agreement for a service implemented by PE routers 88 using the pseudowire. CFM module 42A may provide to the administrative entity the packet loss data as a packet loss ratio by dividing the packet loss by the transmission counter difference. CFM module 42A may further provide the period over which pseudowire packet loss is computed, where the period may be calculated as T=(tc−tp).

Various embodiments of the invention have been described. These and other embodiments are within the scope of the following claims.

The invention claimed is:

1. A method comprising:
receiving, by a local router from a local layer two (L2) network coupled to the local router via an attachment circuit for a Virtual Private Local Area Network (LAN) Service (VPLS) instance, a plurality of L2 packet data units (PDUs);
sending, by the local router via a first pseudowire to a first remote router, each of the plurality of PDUs;
sending, by the local router via a second pseudowire to a second remote router that is different from the first remote router, each of the plurality of PDUs, wherein the first pseudowire and the second pseudowire operate over a layer three (L3) packet-switched network to transport the plurality of PDUs for the VPLS instance;
applying, by the local router, a first pseudowire label policer to increment a first transit counter associated with the first pseudowire for each of the plurality of PDUs that the local router sends via the first pseudowire to the first remote router;
applying, by the local router, a second pseudowire label policer to increment a second transit counter associated with the second pseudowire for each of the plurality of PDUs that the local router sends via the second pseudowire to the second remote router;
receiving, by the local router from the first remote router, a first receipt counter value for the first pseudowire that indicates a count of PDUs received by the first remote router from the local router via the first pseudowire;

receiving, by the local router from the second remote router, a second receipt counter value for the second pseudowire that indicates a count of PDUs received by the second remote router from the local router via the second pseudowire;

determining pseudowire packet loss data for the first pseudowire computing a first difference value between a first transmit counter value of the first transmit counter and the first receipt counter value and for the second pseudowire by computing a second difference value between a second transmit counter value of the second transmit counter and the second receipt counter value; and sending the pseudowire packet loss data including the first difference value for the first pseudowire and the second difference value for the second pseudowire from the local router to a management entity.

2. The method of claim 1, wherein sending, by the local router via the first pseudowire to the first remote router, each of the plurality of PDUs comprises adding a first outbound pseudowire label to each of the plurality of PDUs to form a plurality of outbound pseudowire packets for the first pseudowire, and where applying, by the local router, the first pseudowire label policer comprises applying the first pseudowire label policer to each of the plurality of outbound pseudowire packets for the first pseudowire and incrementing the first transmit counter for each of the plurality of outbound pseudowire packets having the first outbound pseudowire label;

wherein sending, by the local router via the second pseudowire to the second remote router, each of the plurality of PDUs comprises adding a second outbound pseudowire label to each of the plurality of PDUs to form a plurality of outbound pseudowire packets for the second pseudowire, and where applying, by the local router, the second pseudowire label policer comprises applying the second pseudowire label policer to each of the plurality of outbound pseudowire packets for the second pseudowire and incrementing the second transmit counter for each of the plurality of outbound pseudowire packets having the second outbound pseudowire label.

3. The method of claim 1, further comprising:

in response to determining, by the local router, each of the plurality of PDUs comprises broadcast, multicast, or unidentified unicast traffic for the VPLS instance, sending each of the plurality of PDUs via the first pseudowire to the first remote router and sending each of the plurality of PDUs via the second pseudowire to the second remote router;

receiving, by the local router from the local L2 network, an additional L2 PDU; and sending, by the local router to the first remote router via the first pseudowire, the additional PDU without sending the additional PDU to the second remote router via the second pseudowire.

4. The method of claim 1, wherein applying, by the local router, a first pseudowire label policer to increment a first transit counter associated with the first pseudowire comprises incrementing the first transmit counter during an intermediate point within a next hop chaining process performed by the local router to send the plurality of PDUs via the first pseudowire.

5. The method of claim 1, further comprising:

receiving VPLS instance configuration data with the local router; and establishing the first pseudowire and the second pseudowire with the local router based at least on the VPLS instance configuration data.

6. The method of claim 1, further comprising:

incrementing a local receipt counter associated with the first pseudowire for each of a plurality of inbound pseudowire packets received by the local router from the first remote router via the first pseudowire; and receiving, by the local router from the first remote router, a remote transmit counter value for the first pseudowire from the first remote router, wherein the remote transmit counter value indicates a count of pseudowire packets transmitted by the first remote router via the first pseudowire, wherein determining pseudowire packet loss data for the first pseudowire comprises computing a near-end pseudowire packet loss as a difference between the remote transmit counter value for the first pseudowire and a value for the local receipt counter associated with the first pseudowire, wherein sending the pseudowire packet loss data from the local router to the management entity comprises sending the near-end pseudowire packet loss.

7. The method of claim 6, further comprising:

receiving the first receipt counter value and the remote transmit counter value in a loss measurement reply (LMR) message formed in accordance with a Loss Measurement Message protocol.

8. The method of claim 1, further comprising:

sending the first transmit counter value to the first remote router in a loss measurement message formed in accordance with a Loss Measurement Message protocol.

9. A router comprising:

a control unit having one or more processors;

one or more interface cards configured to receive, from a local layer two (L2) network coupled to the router by an attachment circuit for a Virtual Private Local Area Network (LAN) Service (VPLS) instance configured for the router, a plurality of L2 packet data units (PDUs);

a VPLS layer of the control unit configured to send, via a first pseudowire to a first remote router, each of the plurality of PDUs, wherein the VPLS layer is further configured to send, via a second pseudowire to a second remote router that is different from the first remote router, each of the plurality of PDUs, wherein the first pseudowire and the second pseudowire operate over a layer three (L3) packet-switched network to transport the plurality of PDUs for the VPLS instance;

a first pseudowire label policer configured for application by the router to increment a first transit counter associated with the first pseudowire for each of the plurality of PDUs that the local router sends via the first pseudowire to the first remote router;

a second pseudowire label policer configured for application by the router to increment a second transit counter associated with the second pseudowire for each of the plurality of PDUs that the local router sends via the second pseudowire to the second remote router, wherein the one or more interface cards are further configured to receive, from the first remote router, a first receipt counter value for the first pseudowire that indicates a count of PDUs received by the first remote router from the local router via the first pseudowire, and wherein the one or more interface cards are further configured to receive, from the second remote router, a second receipt counter value for the second pseudowire that indicates a count of PDUs received by the second remote router from the local router via the second pseudowire;

a loss measurement module of the control unit configured to determine pseudowire packet loss data for the first pseudowire by computing a first difference value between a first transmit counter value of the first transmit counter and the first receipt counter value and for the second pseudowire by computing a second difference value between a second transmit counter value of the second transmit counter and the second receipt counter value; and a management interface of the control unit configured to send the pseudowire packet loss data including the first difference value for the first pseudowire and the second difference value for the second pseudowire from the local router to a management entity.

10. The router of claim 9, further comprising:

a pseudowire layer configured to send, via the first pseudowire to the first remote router, each of the plurality of PDUs by adding a first outbound pseudowire label to each of the plurality of PDUs to form a plurality of outbound pseudowire packets for the first pseudowire, wherein the first pseudowire label policer is further configured for application to each of the plurality of outbound pseudowire packets for the first pseudowire and to increment the first transmit counter for each of the plurality of outbound pseudowire packets having the first outbound pseudowire label, wherein the pseudowire layer is further configured to send, via the second pseudowire to the second remote router, each of the plurality of PDUs by adding a second outbound pseudowire label to each of the plurality of PDUs to form a plurality of outbound pseudowire packets for the second pseudowire, and wherein the second pseudowire label policer is further configured for application to each of the plurality of outbound pseudowire packets for the second pseudowire and to increment the first transmit counter for each of the plurality of outbound pseudowire packets having the second outbound pseudowire label.

11. The router of claim 9, wherein the one or more interface cards are further configured to receive, from the local L2 network, an additional L2 PDU, and wherein the VPLS layer is further configured to send, to the first remote router via the first pseudowire, the additional PDU without sending the additional PDU to the second remote router via the second pseudowire.

12. The router of claim 9, wherein the management interface is further configured to receive VPLS instance configuration data, the router further comprising:

a VPLS module of the control unit configured to establish the first pseudowire and the second pseudowire based at least on the VPLS instance configuration data.

13. The router of claim 9, wherein the first pseudowire label policer is further configured to increment a local receipt counter associated with the first pseudowire for each of a plurality of inbound pseudowire packets received from the first remote router via the first pseudowire, wherein the loss measurement module is further configured to receive, from the first remote router, a remote transmit counter value for the first pseudowire from the first remote router, wherein the remote transmit counter value indicates a count of pseudowire packets transmitted by the first remote router via the first pseudowire, wherein to determine pseudowire packet loss data for the first pseudowire the loss measurement module is further configured to compute a near-end pseudowire packet loss as a difference between the remote transmit counter value for the first pseudowire and a value for the local receipt counter associated with the first pseudowire, wherein the management interface is further configured to send the near-end pseudowire packet loss to the management entity.

14. The router of claim 13, further comprising:

a connectivity fault management module that includes corresponding first and second maintenance entity endpoints (MEPs) for the first pseudowire and the second pseudowire, wherein the first MEP receives the first receipt counter value and the remote transmit counter value in a loss measurement reply (LMR) message formed in accordance with a Loss Measurement Message (LMM) protocol.

15. The router of claim 9, wherein the first MEP sends the first transmit counter value to the first remote router to the first remote router in a loss measurement message (LMM) formed in accordance with the LMM protocol.

16. A non-transitory computer-readable medium comprising instructions that cause a processor to:

receive, by a local router from a local layer two (L2) network coupled to the local router by an attachment circuit for a Virtual Private Local Area Network (LAN) Service (VPLS) instance, a plurality of L2 packet data units (PDUs);

send, by the local router via a first pseudowire to a first remote router, each of the plurality of PDUs;

send, by the local router via a second pseudowire to a second remote router that is different from the first remote router, each of the plurality of PDUs, wherein the first pseudowire and the second pseudowire operate over a layer three (L3) packet-switched network to transport the plurality of PDUs for the VPLS instance;

apply, by the local router, a first pseudowire label policer to increment a first transit counter associated with the first pseudowire for each of the plurality of PDUs that the local router sends via the first pseudowire to the first remote router;

apply, by the local router, a second pseudowire label policer to increment a second transit counter associated with the second pseudowire for each of the plurality of PDUs that the local router sends via the second pseudowire to the second remote router;

receive, by the local router from the first remote router, a first receipt counter value for the first pseudowire that indicates a count of PDUs received by the first remote router from the local router via the first pseudowire;

receive, by the local router from the second remote router, a second receipt counter value for the second pseudowire that indicates a count of PDUs received by the second remote router from the local router via the second pseudowire;

determine pseudowire packet loss data for the first pseudowire computing a first difference value between a first transmit counter value of the first transmit counter and the first receipt counter value and for the second pseudowire by computing a second difference value between a second transmit counter value of the second transmit counter and the second receipt counter value; and send the pseudowire packet loss data including the first difference value for the first pseudowire and the second difference value for the second pseudowire from the local router to a management entity.

17. The non-transitory computer-readable medium of claim 16, wherein to send, by the local router via the first pseudowire to the first remote router, each of the plurality of PDUs the instructions further cause the processor to add a first outbound pseudowire label to each of the plurality of PDUs to form a plurality of outbound pseudowire packets for the first pseudowire, and where to apply, by the local router, the first pseudowire label policer the instructions further cause the processor to apply the first pseudowire label policer to each of the plurality of outbound pseudowire packets for the first pseudowire and increment the first transmit counter for each of the plurality of outbound pseudowire packets having the first outbound pseudowire label;

wherein to send, by the local router via the second pseudowire to the second remote router, each of the plurality of PDUs the instructions further cause the processor to add a second outbound pseudowire label to each of the plurality of PDUs to form a plurality of outbound pseudowire packets for the second pseudowire, and where to apply, by the local router, the second pseudowire label policer the instructions further cause the processor to apply the second pseudowire label policer to each of the plurality of outbound pseudowire packets for the second pseudowire and increment the second transmit counter for each of the plurality of outbound pseudowire packets having the second outbound pseudowire label.

18. A method comprising:

receiving, by a local router from a local layer two (L2) network coupled to the local router by an attachment circuit for a Virtual Private Local Area Network (LAN) Service (VPLS) instance, a plurality of L2 packet data units (PDUs);

sending, by the local router via a first service link to a first remote router, each of the plurality of PDUs;

sending, by the local router via a second service link to a second remote router that is different from the first remote router, each of the plurality of PDUs, wherein the first service link and the second service link operate over a layer three (L3) packet-switched network to transport the plurality of PDUs for the VPLS instance;

applying, by the local router, a first policer to increment a first transit counter associated with the first service link for each of the plurality of PDUs that the local router sends via the first service link to the first remote router;

applying, by the local router, a second policer to increment a second transit counter associated with the second service link for each of the plurality of PDUs that the local router sends via the second service link to the second remote router;

receiving, by the local router from the first remote router, a first receipt counter value for the first service link that indicates a count of PDUs received by the first remote router from the local router via the first service link;

receiving, by the local router from the second remote router, a second receipt counter value for the second service link that indicates a count of PDUs received by the second remote router from the local router via the second service link;

determining service link packet loss data for the first service link computing a first difference value between a first transmit counter value of the first transmit counter and the first receipt counter value and for the second service link by computing a second difference value between a second transmit counter value of the second transmit counter and the second receipt counter value; and sending the service link packet loss data including the first difference value for the first service link and the second difference value for the second service link from the local router to a management entity.

19. The method of claim 18, wherein sending, by the local router via the first service link to the first remote router, each of the plurality of PDUs comprises adding a first outbound service link demultiplexer to each of the plurality of PDUs to form a plurality of outbound service packets for the first service link, and where applying, by the local router, the first policer comprises applying the first policer to each of the plurality of outbound service packets for the first service link and incrementing the first transmit counter for each of the plurality of outbound service packets having the first outbound service link demultiplexer;

wherein sending, by the local router via the second service link to the second remote router, each of the plurality of PDUs comprises adding a second outbound service link demultiplexer to each of the plurality of PDUs to form a plurality of outbound service packets for the second service link, and where applying, by the local router, the second policer comprises applying the second policer to each of the plurality of outbound service packets for the second service link and incrementing the second transmit counter for each of the plurality of outbound service packets having the second outbound service link demultiplexer.

* * * * *